Figure 1:
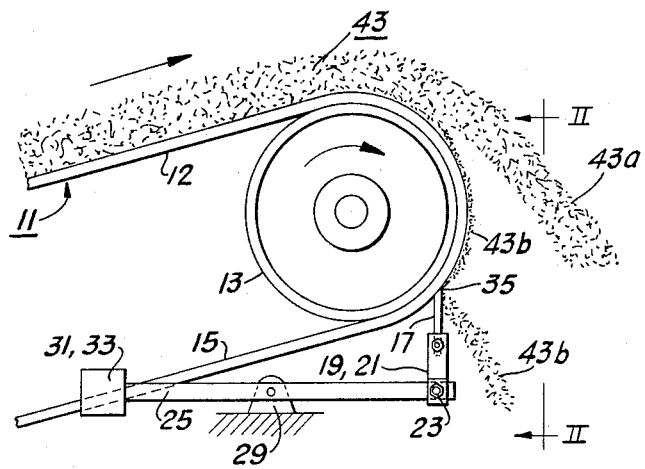

Nov. 29, 1966   N. W. BUNTING   3,288,275
METHOD AND APPARATUS FOR CLEANING CONVEYOR BELTS
Filed Dec. 6, 1965

INVENTOR.
NORMAN W. BUNTING
BY
his Attorney

United States Patent Office 3,288,275
Patented Nov. 29, 1966

3,288,275
METHOD AND APPARATUS FOR CLEANING CONVEYOR BELTS
Norman W. Bunting, Port Area, Manila, Republic of the Philippines, assignor to Koppers Company, Inc., a corporation of Delaware
Filed Dec. 6, 1965, Ser. No. 511,959
5 Claims. (Cl. 198—230)

This invention relates to power driven conveyors and more particularly to apparatus for cleaning and removing particulate matter from a power driven belt conveyor.

A belt conveyor system generally comprises an endless belt, made usually of resilient rubber-like material, including a carrying flight and a return flight, and a number of pulleys, including a head pulley that is power driven, a tail pulley and a number of intermediate idler pulleys. Belt conveyors are commonly employed to move iron ore, limestone, coal, coke, sinter, and like materials from one location to another, but not all material is discharged from the belt. A small amount of dust and fine particulate matter usually clings and adheres to the conveyor belt, generally in the vicinity of the head pulley, either because the belt is electrostatically charged or because the particulate matter and the belt surface are moist. Such residue particulate matter is frequently the cause of much trouble in operating a belt conveyor, particularly where large quantities of material have to be moved long distances. Where, for example, sticky iron ore and like materials are being moved on rubber belt conveyors, the adhesion of the particulate matter to the belt is sometimes sufficient to cause the return flight to improperly track and to deviate from the rollers, resulting in uneven and substantial wear of the belt. If the particulate matter is allowed to build up on the surface of the belt, it may be severely damaged, or it may run off the tail pulley and cause a shutting down of the entire belt conveyor system.

Numerous mechanical devices, such as scrapers or doctor blades, have been proposed heretofore for removing the residue materials from power-driven conveyor belts, but none has proved to be entirely satisfactory.

According to the invention, a conventional scraper or doctor blade is disposed in contact relation with the conveyor belt, adjacent the head pulley, and preferably at the commencement of the return flight. The scraper or doctor blade is adapted to be both vibrated and reciprocated horizontally in a direction generally normal to the path of the return flight, whereby any residue material on the belt is removed.

For a further understanding of the present invention and for further advantages and features thereof, reference may be made to the following description taken in conjunction with the accompanying drawing which shows, for the purpose of exemplification, a preferred embodiment of the invention.

Figure 2:
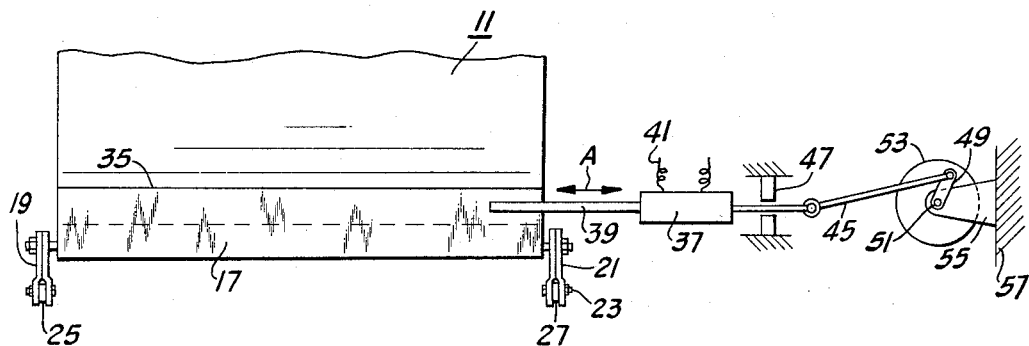

In the drawing:

FIGURE 1 is a schematic elevational view of apparatus for cleaning a conveyor belt embodying the present invention; and FIGURE 2 is a view along line II—II of FIGURE 1.

In FIGURE 1, the material discharge end portion of a conveyor belt 11 comprises a carrying flight 12 which runs over a powered head pulley 13 and a return flight 15 which is shown leaving the lower side of the head pulley 13. Adjacent the head pulley 13 and in contact with the return flight 15, there is a conventional type of scraper or doctor blade 17, which is flexibly mounted in support arms 19, 21. The support arms 19, 21 (FIGURE 2) are also flexibly mounted, by suitable bolt-type fastener 23 located at the ends of levers 25, 27, and each such lever is pivotally mounted to suitable fulcrum supports 29. Each lever 25, 27 is also provided with a counterweight 31, 33 that is adjustably positionable on the lever for the purpose of varying the degree of contact between the upper edge 35 of the scraper blade 17 and the surface of the return flight 15.

Adjacent one side of the scraper blade 17 (the right side as viewed in FIGURE 2), there is a conventional type of electric vibrator 37 which is connected to the scraper blade 17 by means of an actuator rod 39 whereby the scraper blade can be vibrated in a horizontal direction. Such vibratory motion is suggested by the directional arrow A. The vibrator 37 may be operated in any suitable manner, as by electric current flowing thereto via lead wires 41, or by a supply of air if the vibrator is of the air actuated type. Preferably, the vibrator 37 is of the high frequency electric type, but in some applications the type of vibrator will be determined largely by the type of material 43 that is being moved by the belt conveyor 11. For example, if the material 43 is light and dry, a material which has a tendency to adhere electrostatically to the return flight, then one type of vibrator should be used. Whereas, if the material 43 is heavy and moist, a material which tends to stick to the return flight, then another type of vibrator should be used. The type of vibrator that is selected should be suitable for the type of material being handled.

The vibrator 37 is also connected to an articulated connecting rod 45, one portion of which is horizontally guided by opposed bearings 47 while the other portion is pin connected to a crank 49 which is fixed to a shaft 51. The shaft 51 is driven by a suitable motor 53, or other prime mover, and is suitably journaled in support brackets 53 that are fixed to a support 57.

When the conveyor belt 11 is operating and carrying material 43, the major portion 43a of the material is discharged from the belt at the head pulley 13 in the manner suggested in FIGURE 1. Some portion 43b of the material 43, however, adheres to the return flight and is encountered by the doctor blade 17. The doctor blade 17 vibrates at high frequency and also reciprocates horizontally whereby the material 43b is first loosened by the vibratory motion and then removed by the horizontal reciprocatory motion of the doctor blade.

A feature of the present invention is found in the vibrating horizontally reciprocable doctor blade; the vibratory motion being effective to loosen the material from adhesion to the return flight and the reciprocatory motion being effective to remove the loosened residue material. The vibratory and reciprocatory motions are collinear and at any moment the amplitude of movement of the scraper blade is the vector sum of such movements.

While the invention has been described herein with a certain degree of particularity as to a preferred embodiment, it is to be understood the scope of the invention is defined by what is hereinafter claimed.

I claim:
1. Apparatus for removing particulate matter from a material conveyor belt including both a carrying and a return flight, and a driven head pulley comprising:
    (a) a scraper blade pivotally mounted adjacent the head pulley;
    (b) means for pivoting said scraper blade whereby said blade operatively engages the return flight of said conveyor belt;
    (c) means to vibrate said scraper blade in a direction substantially normal to the path of travel of said conveyor belt; and
    (d) means connected to said vibrator means whereby said vibrator and said scraper blade are reciprocated horizontally in a direction substantially normal to the direction of travel of said return flight.

2. The combination, with a material conveyor belt including both a carrying and a return flight, and a power driven head pulley, of apparatus for cleaning particulate matter from the belt comprising:
 (a) a scraper blade engaging said return flight;
 (b) means to vibrate said scraper blade in a direction substantially normal to the direction of travel of the return flight; and
 (c) driven means interconnecting said vibratory means whereby said scraper blade and said vibratory means reciprocate in a direction that is substantially normal to the direction of travel of said return flight.

3. The combination, with a material conveyor belt including both a carrying and a return flight, and a power driven head pulley of apparatus for cleaning particulate matter from the belt comprising:
 (a) a scraper blade pivotally mounted adjacent the head pulley;
 (b) means for pivoting said scraper blade where said blade operatively engages the return flight of said conveyor belt;
 (c) means to vibrate said scraper blade in a direction substantially normal to the path of travel of said conveyor belt; and
 (d) a driven shaft having a crank linked to said vibrator whereby when said shaft rotates said crank reciprocates both said vibrator and said scraper blade in a direction substantially normal to the path of travel of said return flight.

4. Apparatus for removing particulate matter from a material conveyor belt including both a carrying and a return flight powered by a driven head pulley comprising:
 (a) a scraper blade operatively engaging said return flight; and
 (b) means to simultaneously vibrate and reciprocate said scraper blade collinearly whereby the phase movement of said blade is the vector sum of the vibratory and the reciprocatory motions.

5. A scraper blade for removing particulate matter from a material conveyor belt comprising:
 (a) means to vibrate said scraper blade in a direction substantially perpendicular to the direction of movement of said belt; and
 (b) means to simultaneously reciprocate said scraper blade collinearly with said vibrating scraper blade whereby the resultant movement of said scraper blade is the vector sum of said vibratory and reciprocatory movement.

References Cited by the Examiner

UNITED STATES PATENTS 2,885,069  5/1959  Bowen _____ 198—230

FOREIGN PATENTS 1,385,524  12/1964  France.

EVON C. BLUNK, *Primary Examiner.*

R. E. AEGERTER, *Assistant Examiner.*